Feb. 21, 1967 R. THOMAS 3,305,670

DATA READING APPARATUS

Filed Sept. 7, 1962

United States Patent Office 3,305,670

Patented Feb. 21, 1967

3,305,670

DATA READING APPARATUS

Roy Thomas, Acton, London, England, assignor to English Electric-Leo Computers Limited, a British company Filed Sept. 7, 1962, Ser. No. 222,153
Claims priority, application Great Britain, Sept. 11, 1961, 32,497/61
5 Claims. (Cl. 235—61.11)

This invention relates to a method and apparatus for reading data recorded in a number of parallel channels on tape or a like data bearing medium. The invention is particularly, but not exclusively, suitable for use with perforated tape, read by electro-mechanical or photoelectric means.

Tape for data recording in parallel channels bears a line of location holes, one per data recording position, which holes may be punched at the same time as data is recorded on the tape, and which, in conjunction with a special reader, cause the generation of a strobe pulse for each data recording position. This pulse controls the readers for the data channels.

The present invention seeks to provide a reading method in which a wider longitudinal tolerance of hole positions can be accepted than in known systems in which reading is controlled by strobe pulses one of which is generated from each of the location holes (or other location indicia carried by the tape). This is achieved, according to the present invention, by generating in response to each location hole or indicium a train of pulses, whose basic pulse repetition frequency is high compared with the frequency at which data bearing positions occur.

Apparatus for reading data-representing marks on a data carrier having a series of location marks each associated with one of a plurality of successively-readable data marking positions according to this invention comprises, in combination, control reading means for producing an electrical control output whenever a location mark is passing a reading position, data reading means for producing electrical data outputs from data-representing marks in the marking position associated with that location mark, an oscillator adapted to produce pulses at a relatively high repetition frequency, a register for receiving data read from the data carrier, and first and second gates arranged respectively to be open and to be closed during the existence of each said control output, said first gate when open delivering pulses from the oscillator to serve as strobe pulses gating the data outputs to a data input of the register and said second gate when open connecting the oscillator to a control input of the register to cause read out of data held therein.

Figure 1:
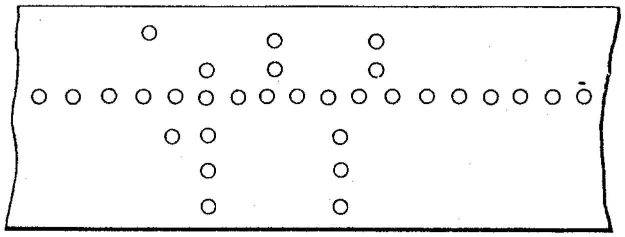
Figure 2:
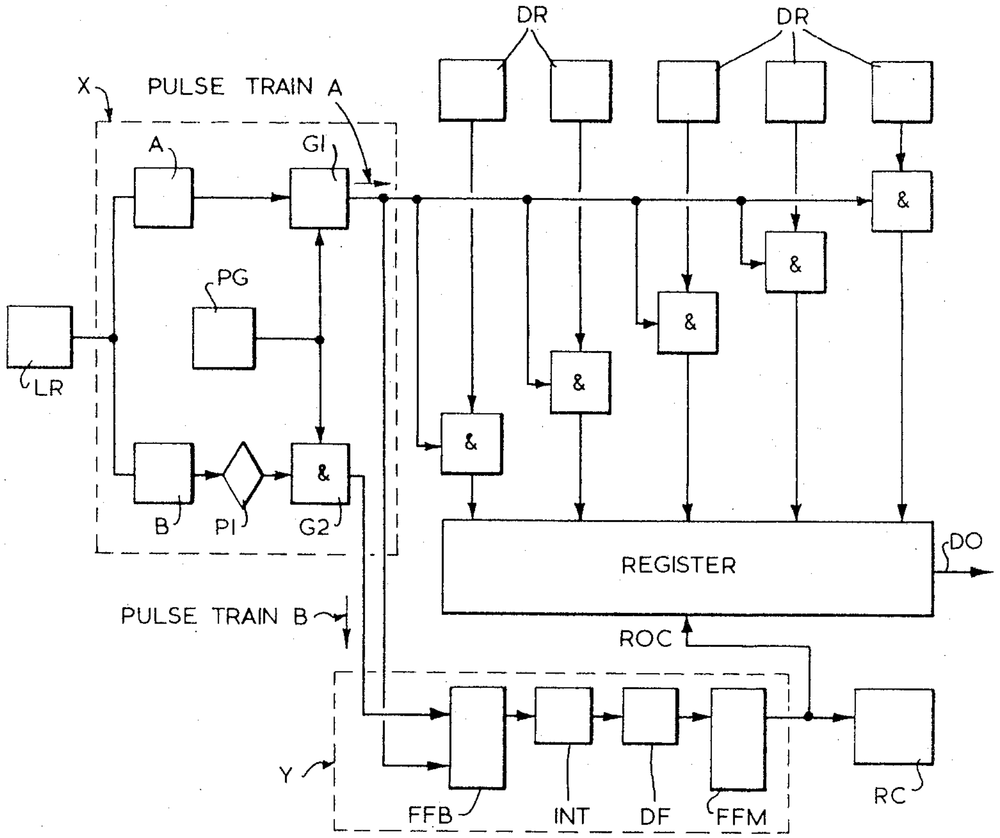

In order that the invention may be more fully understood a preferred embodiment thereof will now be described with reference to the accompanying drawings, in which:

FIGURE 1 shows a typical strip of tape for use in the preferred apparatus of the invention; and FIGURE 2 is a circuit drawing of the preferred apparatus of the invention which is used to read tape such as that shown in FIGURE 1.

In the accompanying drawing, FIGURE 1 shows a typical strip of tape for symbols in five-unit code on which a number of rows each representing a symbol have been punched across the width of the tape. The row of smaller holes are the location holes mentioned above, which control strobe pulse generation. The tolerance of the data holes with respect to the edges of the tape is normally good, i.e. a high degree of accuracy is attained in this respect. However, the longitudinal tolerance of the holes of a row may be relatively poor, i.e. the degree of accuracy in this respect may not be so good.

Since all the hole positions of the same character are sensed (photo-electrically in the instant example) simultaneously, the instant at which reading is performed is critical.

FIGURE 2 shows in block schematic form a circuit X for producing two pulse trains, one of which is the strobe pulse train for reading control, and a circuit Y for deriving a single pulse from the two trains of pulses both connected as parts of a complete reading apparatus suitable for reading characters from tape at speeds of the order of 1000 characters per second.

In the circuit of FIGURE 2, there are two discriminators A and B, to which the location signals are applied. The location signals are obtained from a reading device LR which cooperates with the row of location holes in the tape, to produce one signal for each hole which is read. This signal is not a "square" pulse, but has inclined leading and trailing edges and lasts as long as the location hole is passing the reading device. Each such signal is fed to the two discriminators, of which discriminator B responds to a lower voltage level than does A (and therefore responds earlier to each location signal in view of its inclined leading edge). The outputs of these discriminators control two AND gates G1 and G2, G1 being directly controlled and G2 being controlled via an inverter PI. The second input to the two gates is from a free-running pulse generator PG, which supplies short, sharp pulses at a relatively high frequency, e.g. 100 kc./s.

It will be seen that in the absence of a location signal the gate G2 is held open from the discriminator B via the inverted PI, so that a pulse train occurs on the output from G2, which is referred to as pulse train B. When a location signal occurs, the discriminators respond, B responding first to close the gate G2 via PI, so as to terminate pulse train B. A short period after this, discriminator A responds and opens gate G1 to produce pulses on its output, these forming pulse train A. At the end of the location signal, the discriminators respond in the reverse order, A closing G1 to terminate pulse train A, whereafter B opens G2 to restart pulse train B. With the tape running at its normal speed, pulse train A comprises about twenty pulses, and this block of short pulses is used to strobe the output from the data channel reading devices.

The location signal produced by the reading of a location hole being a pulse whose duration is the period for which the location hole is being read by its reading device, pulse train A is produced throughout this reading, and the strobing of the outputs from the reading devices for the data channels commences with the first pulse of pulse train A. This pulse occurs almost immediately after the response to the location hole has occurred. Since pulse train A continues throughout the reading period of the location hole, strobing occurs throughout this period with the result that a relatively large misplacement of the data holes, either backwards or forwards along the tape, can be tolerated.

The system herein described should be compared with the conventional system in which the response to a location hole is used to produce an accurately shaped pulse which is delayed so as to commence at or near to the mid-point of the location hole's reading period. In such a system the delay is determined for one particular speed, so that incorrect reading may occur at other speeds. Further, if (as is usualy the case) A.C. coupled circuitry is used in the strobing circuits, there will be a tape speed below which the response to a location hole will fail to produce a strobe pulse, so that no reading will occur. These disadvantages are overcome by the arrangement herein described. Hence the reading tolerance is improved as compared with conventional systems using the location signal itself for strobing. If the tape is running at less than normal speed, for example while accelerating or while being advanced manually, correct reading is possible because the sole result is that the location signal causes the production of a pulse train A containing more pulses than usual. As mentioned above, this slow running will cause inaccurate reading or even no reading in the conventional system. These pulses in the lengthened A train due to slow running are of the same shape and spacing from each other as usual so that normal reading occurs, whereas with conventional systems reading at speed other than normal may be erratic.

The difference between the levels at which the discriminators respond can be adjusted in accordance with the degree of interference which is to be expected. Where the power for photo-electric readers is derived from 50 cycle mains, the light output due to tihe lamps used in the readers may be modulated at 100 c./s. With a conventional system this modulation may lead to errors as it could produce a spurious reading signal if the tape is stopped with a location hole passing a small proportion of the usual light which it passes, due to the edge of the being in the light path. In addition, the falling output as a data hole is receding from the reading position could if it is modulated in the manner just mentioned, produce a spurious signal due to a modulation crest. In the present system the difference in discriminator levels eliminates these risks.

As already mentioned, the pulse train A due to each location hole is gated with each data signal from reading devices DR and the output from each data-reading gate is used to set the appropriate element of a static register, shown for example only as having five storage elements and hence five data inputs.

With the above arrangement it is possible that at the beginning or end of a pulse train, pulses may be reduced in amplitude or width due to gating action, if the pulses which control the gates have relatively slow-rising or falling edges. For strobing the data this is unimportant, because the output from the data channel reading devices is strobed throughout the duration of the A train. However, in the case of pulse train B, whose uses will be described below, it is necessary to ensure that an acceptable pulse is produced at the commencement of the train.

The occurrence of pulse train B is an indication that reading of a data row has been completed, and a single pulse therefrom can be used to initiate transfer of the data from the portion of the static register in which it was originally placed to its next intended destination. In addition, this single pulse, or a delayed version thereof, may be used to step a counter R*c* for counting the number of data rows which have been read. For either of these purposes it will be apparent that an accurate single pulse is needed.

FIGURE 2 also shows a circuit Y for deriving a single pulse corresponding to each B pulse train. This includes a bistable device FFB to the set (uppermost) input of which pulse train B is applied, pulse train A being applied to the reset input, the lowermost input. Therefore the bistable device is set between reading operations and reset during a reading operation. The set output of FFB is used to control a monostable flip-flop FFM: this latter when stimulated by the application to it of a pulse produces an output pulse whose characteristics are determined only by the circuit constants of FFM. To ensure that FFM receives a pulse whose characteristics are adequate to trigger it, the set output of FFB is passed to FFM via integrator INT, followed by a discriminator DF which has positive feedback. The output from the integrator INT commences to rise as soon as the set output of FFB commences, and after a period adequate for the output from FFB to settle down at its set level it reaches a value which will operate the monostable flip-flop FFM; as a consequence the flip-flop FFM does not produce its output until the output from FFB has settled down. Consequently there is produced a single and accurate contol pulse as a consequence of the commencement of each pulse train B. This pulse occurs immediately after the data reading mentioned above, and so is suitable for application to input ROC of the register, this input being for read-out control, i.e. receipt of a pulse from FFM causes read-out of data stored in the register at data output DO (which although shown as a single output line may of course comprise a plurality of conductors).

I claim:

1. Apparatus for reading data-representing marks on a data carrier having a series of location marks each associated with one of a plurality of successively-readable data marking positions, said apparatus comprising, in combination, control reading means for producing an electrical control output whenever a location mark is passing a reading position, data reading means for producing electrical data outputs from data-representing marks in the marking position associated with that location mark, an oscillator adapted to produce pulses at a relatively high repetition frequency, a register for receiving data read from the data carrier, and first and second gates arranged respectively to be open and to be closed during the existence of each said control output, said first gate when open delivering pulses from the oscillator to serve as strobe pulses gating the data outputs to a data input of the register and said second gate when open connecting the oscillator to a control input of the register to cause read out of data being held therein.

2. Apparatus for reading data-representing marks on a data carrier having a series of location marks each associated with one of a plurality of successively-readable data marking positions, said apparatus comprising, in combination, control reading means for producing an electrical control output whenever a location mark is passing a reading position, data reading means for producing electrical data outputs from data-representing marks in the marking position associated with that location mark, an oscillator adapted to produce pulses at a relatively high repetition frequency, a register for receiving data read from the data carrier, and first and second discriminators under control of said control output, and first and second gates under control of said first and second discriminators respectively, said first gate when open delivering pulses from the oscillator serve as strobe pulses gating the data outputs to a data input of the register and said second gate when open connecting the oscillator to a control input of the register to cause read out of data held therein.

3. Apparatus for reading data-representing marks on a data carrier having a series of location marks each associated with one of a plurality of successively-readable data marking positions, said apparatus comprising, in combination, control reading means for producing an electrical control ouput whenever a location mark is passing a reading position, data reading means for producing electrical data outputs from data-representing marks in the marking position associated with that location mark, an oscillator adapted to produce pulses at a relatively high repetition frequency, a register for receiving data read from the data carrier, and first and second gates arranged respectively to be open and to be closed during the existence of each said control output, a bistable flip-flop arranged to receive pulses at set and reset inputs from said second gate and said first gate respectively, an integrator arranged to receive an output from said bistable flip-flop whenever the latter is set, and a discriminator with positive feed back arranged to receive the output from said integrator and deliver an output to a monostable flip-flop, said first gate when open delivering pulses from the oscillator to serve as strobe pulses gating the data outputs to a data input of the register and said second gate when open delivering pulses from the oscillator via said bistable flip-flop, integrator, discriminator and monostable flip-flop to a control input of the register to cause read out of data held therein.

4. Apparatus for reading data-representing marks on a data carrier having a series of location marks each associated with one of a plurality of successively-readable data marking positions, said apparatus comprising, in combination, control reading means for producing an electrical control output whenever a location mark is passing a reading position, data reading means for producing electrical data outputs from data-representing marks in the marking position associated with that location mark, an oscillator adapted to produce pulses at a relatively high repetition frequency, a register for receiving data read from the data carrier, first and second discriminators under control of said control output, first and second gates under control of said first and second discriminators respectively, a bistable flip-flop arranged to receive pulses at set and reset inputs from said second gate and said first gate respectively, an integrator to receive an output from said bistable flip-flop whenever the latter is set, and a discriminator with positive feed back arranged to receive the output from said integrator and deliver an output to a monostable flip-flop, said first gate when open delivering pulses from the oscillator to serve as strobe pulses gating the data outputs to a data input of the register and said second gate when open delivering pulses from the oscillator via said bistable flip-flop integrator, discriminator and monostable flip-flop to a control input of the register to cause read out of data held therein.

5. Apparatus for reading data-representing marks from a data carrier having a series of location marks each associated with one of a plurality of successively-readable data marking positions, comprising control reading means for sensing said location marks, data reading means for sensing data-representing marks in the associated marking positions, a register, means for gating output from the data reading means to the register, and means for converting each output from the control reading means into a succession of short pulses at a high repetition frequency and applying said pulses to the gating means to allow each output from the data reading means to reach the register during a plurality of short intervals during the existence of each output from the control reading means.

No references cited.

ROBERT C. BAILEY, *Primary Examiner.*

G. D. SHAW, *Assistant Examiner.*